Sept. 7, 1965  P. WAINE ET AL  3,205,148
ROD CLUSTER FUEL ASSEMBLY SUPPORT STRUCTURE FOR NUCLEAR REACTOR
Filed Oct. 16, 1961  5 Sheets-Sheet 3
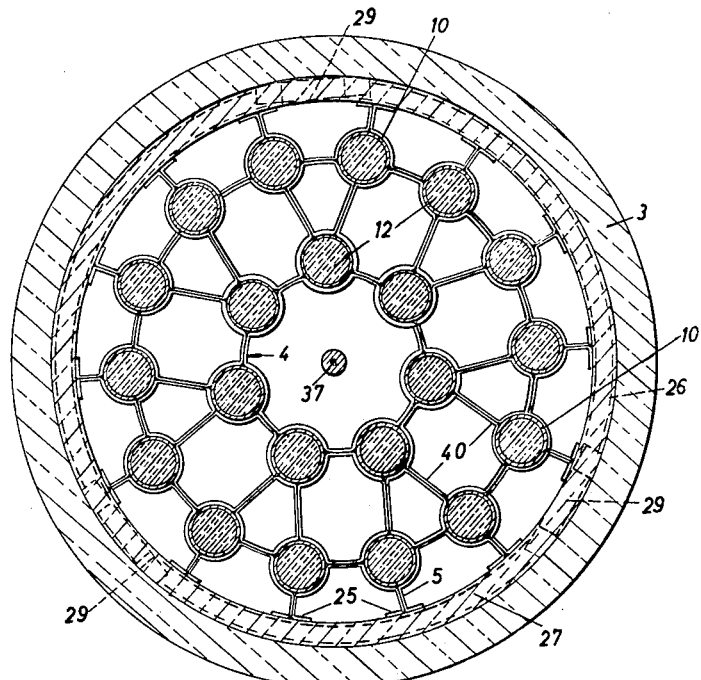
—FIG. 2.—
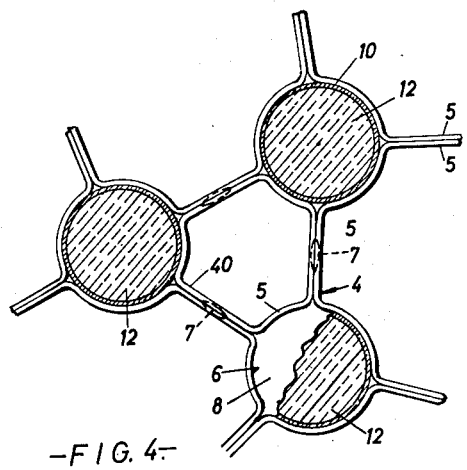
—FIG. 4.—

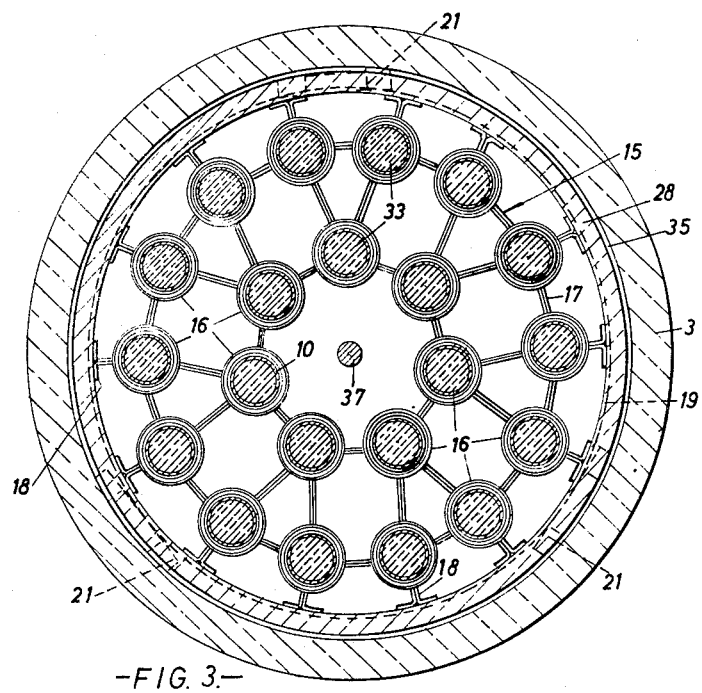
—FIG. 3.—
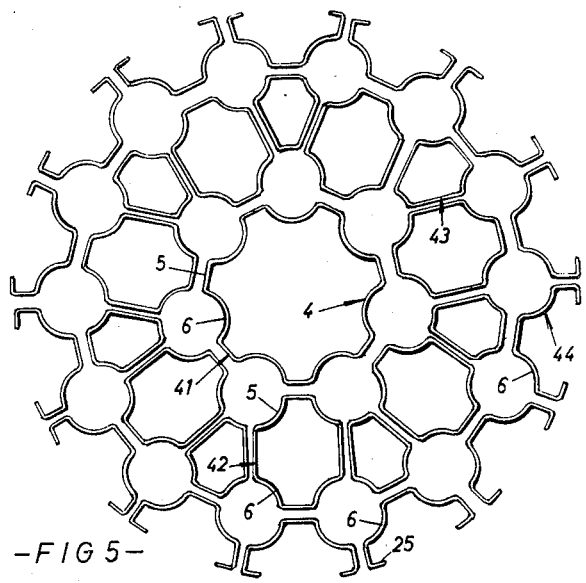
—FIG 5—

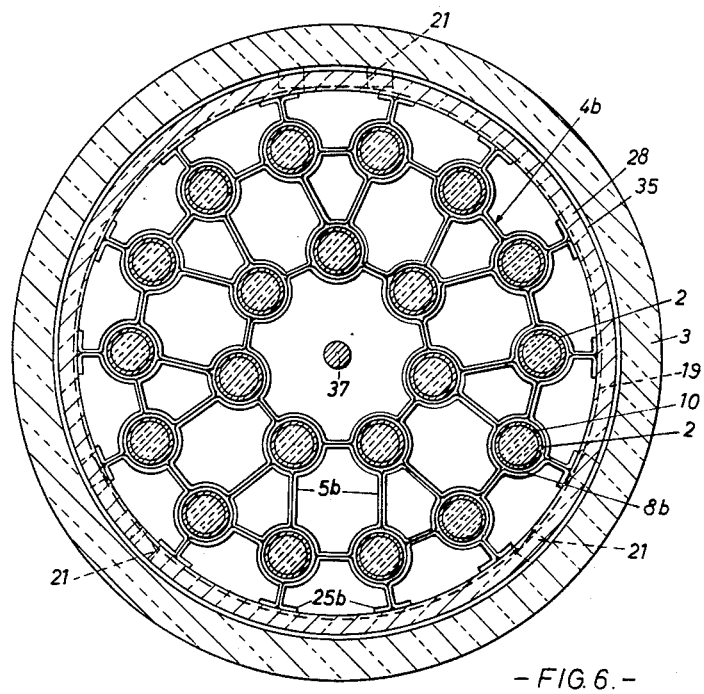
−FIG. 6.−
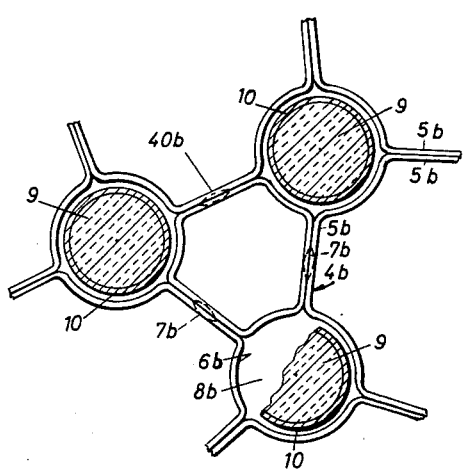
−FIG. 6a.−

United States Patent Office 3,205,148
Patented Sept. 7, 1965

3,205,148
ROD CLUSTER FUEL ASSEMBLY SUPPORT
STRUCTURE FOR NUCLEAR REACTOR
Peter Waine, Padgate, Warrington, and James Duncan
Waters, Lymm, England, assignors to United Kingdom
Atomic Energy Authority, London, England
Filed Oct. 16, 1961, Ser. No. 145,259
Claims priority, application Great Britain, Oct. 27, 1960,
36,927/60
1 Claim. (Cl. 176—78)

This invention relates to nuclear fuel assemblies of the type comprising a closely spaced lattice of parallel disposed sheathed fuel rods located by support structures and hereinafter referred to as a "rod cluster fuel assembly."

The fuel rod support structures introduce neutron absorbing material and coolant flow restricting material into the assembly and it therefore becomes an object of the invention to provide a fuel rod support structure of improved character in relation to neutron absorption and coolant flow restraint.

Under certain conditions of coolant flow, the fuel rods in a rod cluster fuel assembly suffer vibration and accordingly the fuel rod support structures must incorporate means for reducing such vibrations. The fuel rods should not be fixed rigidly in the support structures as this can raise stresses both in the support structures and in the fuel rods and it therefore becomes a further object of the invention to provide a fuel rod support structure of improved character in relation to fuel rod vibration.

According to the invention, a rod cluster fuel assembly support structure of openwork construction is fabricated from strip material troughed transversely at intervals and assembled with the lengths of the strip material intermediate the troughs juxtaposed in pairs to form webs of double thickness with the troughs coming together to define a number of spaced openings bounded with single thickness of strip material for receiving the fuel rods of the cluster, the juxtaposed lengths of the strip material forming each of the webs being secured together remote from the openings.

The invention will now be described by way of example with reference to the accompanying drawings wherein:

FIGURES 2 and 3 are sectional views taken on the lines II—II and III—III of FIGURE 1, FIGURE 4 is an enlarged detail of FIGURE 2, FIGURE 5 is a view similar to FIGURE 2 but of "exploded" form with some parts removed, and FIGURES 6 and 6a show a modification.

Figure 1:
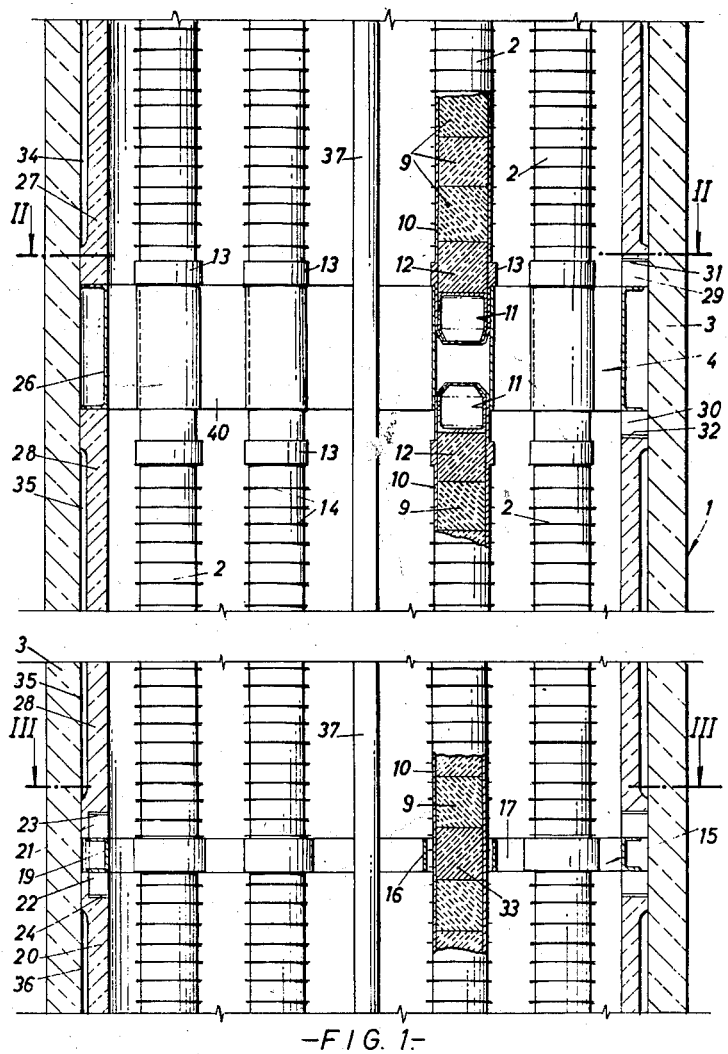
FIGURES 1 and 1a are fragmentary side views partly in medial section.

Referring to FIGURES 1 to 5, a rod cluster fuel assembly 1 comprises two end-stacked, closely-spaced assemblies of twenty-one parallel disposed, sheathed fuel rods 2 contained in a tubular housing 3 of graphite. Adjacent ends of the fuel rods 2 are held in an openwork fuel rod support structure 4 carried by the housing 3 and fabricated from thin (.010") strips 5 of stainless steel having transverse troughs 6 of arcuate form at intervals and assembled with the lengths of the strips 5 intermediate the troughs 6 juxtaposed in pairs to form webs 40 of double thickness with the troughs 6 coming together to define a number of spaced openings 8 bounded with single thickness of strip for receiving the ends of the fuel rods 2. The juxtaposed lengths of the strips 5 forming each of webs 40 are straight and continuous between consecutive troughs 6 and are secured together remote from the openings 8 with localised resistance welds 7. (FIGURE 4.)

Remote ends of the fuel rods 2 are held in openings 8a of support structures 4a which are of form similar to the support structure 4 but of lesser depth. FIGURE 1a shows a support structure 4a at the lower end of the fuel assembly 1. Unless specifically mentioned to the contrary, any description appearing herein relevant to the support structure 4 may be considered applicable to the support structures 4a also.

The strips 5 making up the support structure 4 are fashioned into a number of components 41, 42, 43 and 44 of four differing outlines (FIGURE 5). The outline of the single component 41 is generally septagonal, that of the seven components 42 generally rectangular and that of the seven components 43 generally triangular, the components 41, 42, 43 all having arc-like corners formed by troughs 6. The fourteen components 44 have an outline of generally C shape but with two arc-shaped corners formed by troughs 6.

Figure 1A:
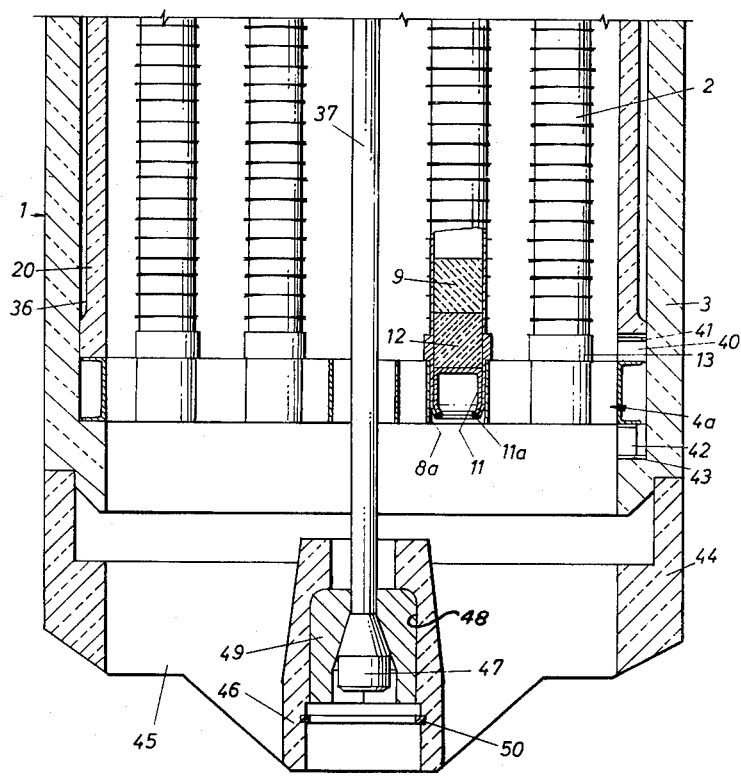

The components 44 have flanged ends 25 welded to the inside of a U section, annular support 26 (.016" in thickness), of stainless steel (FIGS. 1 and 2). The support 26 is disposed between adjacent ends of graphite sleeves 27, 28 lining the interior of the housing 3 and relative movement between the support 26 and the sleeves 27, 28 is prevented by stops 29, 30 carried by the support 26 and located in slots 31, 32 formed in the ends of the sleeves 27, 28.

Each fuel rod 2 comprises a stack of sintered $UO_2$ fuel pellets 9 (.4" diameter, .4" length) contained in a tubular sheath 10 of stainless steel, end-sealed by stainless steel end caps 11. The end caps 11 are a driving fit into the sheath 10 and after fitting are welded thereto by edge welds 11a. After welding, the ends of the commonly-joined end caps and sheath are turned inwards as shown in FIGURE 1 so as to provide easy entry of the fuel rod 2 into an opening 8 of the support structure 4. The fuel pellets 9 are spaced from the end caps 11 by heat-insulating plugs 12 of sintered alumina. The ends of the sheath 10 carry collars 13 and the sheath has a series of circumferential ribs 14 along its length to add strength to the sheath and to increase heat transfer from fuel rod to coolant. The weight of the fuel rods 2 is taken on their lower collars 13 by the upper edges of the strips 5.

The ends of the fuel rods 2 are a push fit within the spaced openings 8 of the support structure 4 so that coolant flow-induced vibrations in the fuel rods are reduced but thermal expansion of the fuel rods is allowed by yielding of the strips 5 from their points of attachment to one another.

Referring more particularly to FIGURE 3, bowing of the fuel rods 2 is held within limits by an openwork structure 15 of stainless steel, formed by a plurality of thin-walled (.020") members 16 of tubular form embracing the fuel rods 2 with clearance over an intermediate length of the rods and interconnected by further thin-walled (.020") members 17 of web form, both disposed edge-on to coolant flow through the housing 3. Flanged webs 18 connect the members 16 with a U section, annular support 19 (.016" in thickness) of stainless steel. The support 19 is disposed between the graphite sleeve 28 and a similar sleeve 20 which rests upon the lower support structure 4a. Relative movement between the support 19 and the sleeves 28, 20 is prevented by stops 21, 22 carried by the support 19 and located in slots 23, 24 formed in the ends of the sleeves 28, 20. Relative movement between the lower support structure 4a and the sleeve 20 is prevented by a stop 40 carried by the support structure 4a and located in a slot 41 in the sleeve 20. Relative movement between the structure 4a (and hence the fuel rods 2, support structure 4 and structure 15) is prevented by a stop 42 carried by the structure 4a and located in a slot 43 at the lower end of the support 3. The lower end of the support 3 is carried on a graphite ring 44 joined by webs 45 to a central boss 46. A tie bar 37 interconects the housing 3, sleeves 27, 28, 20, structures 4, 4a, 15 and ring 44 together to form with fuel rods 2 the complete rod cluster asembly. The tie bar 37 has an enlarged lower end 47 which is held within a recess 48 in the boss 46 by collets 49 and a circlip 50.

Bowing of the fuel rods 2 is unrestrained until the fuel rods contact the walls of the members 16. Where the fuel rods 2 are in register with the members 16 a fuel pellet 9 is replaced by a heat insulating plug 33 of sintered alumina, so that local overheating does not occur should the fuel rods 2 contact the members 16. The structure 15, by allowing a degree of bowing of the fuel rods 2 to occur before restraint, ensures that heat transfer of the rods is not substantially interfered with and at the same time allows simplified fabrication with the fuel rods 2 easily insertable through the members 16. These small movements (e.g. .020") are tolerable and an attempt to fully restrain such movements would introduce additional neutron absorbing material, stress the fuel rods 2, restrict heat transfer and increase difficulties of assembly fabrication.

The graphite sleeves 27, 28, 20 have cut away portions 34, 35, 36 along most of their lengths to define annular spaces which reduce heat transfer from the coolant flowing along the fuel rods 2 to coolant flowing external the housing 3.

The heat insulating plugs 12, 33 being porous, provide voidage for fission product gases produced in the fuel pellets 9 and thus reduce pressure-induced stresses arising in the sheaths 10 when the fuel pellets 9 undergo fission.

In the modification shown in FIGURES 6 and 6a the bow restraint structure 15 is replaced by an openwork structure 4b of similar construction to a fuel rod end-support 4 except that the former defines openings 8b of greater dimension than the openings 8 of the latter so as to embrace the fuel rods 2 with clearance. The structure 4b is fabricated from thin strips 5b with transverse troughs 6b and secured together remote from the openings 8b with resistance welds 7b to form webs 40b of double thickness. The strips 5b of the structure 4b are of the same depth (about .5") as the members 16 and 17 of the structure 15.

We claim:

A rod cluster fuel assembly support structure of openwork construction fabricated from strip material troughed transversely at intervals and assembled with the lengths of the strip material intermediate the troughs in side by side contact to form webs of double thickness with the troughs coming together to define a lattice of spaced openings bounded with single thickness of strip material for receiving the fuel rods of the cluster, means securing the lengths of the strip material forming each of the webs together at points remote from the openings, and a group of said openings being defined by a first strip component and by a series of further strip components surrounding the first component, the first component and each of the further components being constituted by strip material fashioned to the outline of a closed, generally polygonal figure with troughs at its corners.

References Cited by the Examiner

UNITED STATES PATENTS

| | | | |
|---|---|---|---|
| 1,852,363 | 4/32 | Parent | 165—162 |
| 2,929,768 | 3/60 | Mahlmeister et al. | 176—41 |
| 2,983,660 | 5/61 | Loeb et al. | 29—420.5 |
| 3,068,163 | 12/62 | Currier et al. | 176—78 |
| 3,071,527 | 1/63 | Young | 176—78 |
| 3,085,959 | 4/63 | Germer | 176—60 |
| 3,104,218 | 9/63 | Speidel et al. | 176—78 |
| 3,105,026 | 9/63 | Dickson | 176—54 |

FOREIGN PATENTS

| | | |
|---|---|---|
| 671,375 | 5/52 | Great Britain. |
| 823,364 | 11/59 | Great Britain. |

OTHER REFERENCES

Directory of Nuclear Reactors, vol. 4, July 1962, pp. 104, 108.

German printed application 1,085,977, July 28, 1960.
German printed application 1,087,285, Aug. 18, 1960.

CARL D. QUARFORTH, *Primary Examiner.*

OSCAR R. VERTIZ, *Examiner.*